United States Patent
Ota (10) Patent No.: US 8,212,533 B2
(45) Date of Patent: Jul. 3, 2012

(54) ROBOT BATTERY CHARGING APPARATUSES AND METHODS

(75) Inventor: Yasuhiro Ota, Union, KY (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 401 days.

(21) Appl. No.: 12/645,949

(22) Filed: Dec. 23, 2009

(65) Prior Publication Data

US 2011/0148364 A1 Jun. 23, 2011

(51) Int. Cl.
H02J 7/04 (2006.01)
H02J 7/16 (2006.01)

(52) U.S. Cl. ........................................ 320/162; 320/109

(58) Field of Classification Search .................... 320/162
See application file for complete search history.

(56) References Cited

U.S. PATENT DOCUMENTS

| | | | |
|---|---|---|---|
| 4,679,152 A | 7/1987 | Perdue | |
| 5,045,769 A | 9/1991 | Everett, Jr. | |
| 6,292,716 B1* | 9/2001 | Moore et al. | 700/260 |
| 6,567,723 B2* | 5/2003 | Sugawara | 700/245 |
| 6,859,010 B2 | 2/2005 | Jeon et al. | |
| 7,227,334 B2 | 6/2007 | Yang et al. | |
| 7,332,890 B2 | 2/2008 | Cohen et al. | |
| 7,352,153 B2 | 4/2008 | Yan | |
| 7,376,487 B2 | 5/2008 | Kumhyr | |
| 2004/0088081 A1* | 5/2004 | Song et al. | 700/259 |
| 2004/0158357 A1 | 8/2004 | Lee et al. | |
| 2004/0201361 A1 | 10/2004 | Koh et al. | |
| 2005/0083011 A1* | 4/2005 | Yang et al. | 320/107 |
| 2006/0043930 A1* | 3/2006 | Koyanagi et al. | 320/114 |
| 2006/0087273 A1* | 4/2006 | Ko et al. | 318/568.12 |
| 2007/0216347 A1* | 9/2007 | Kaneko et al. | 320/107 |
| 2007/0229031 A1 | 10/2007 | Song et al. | |
| 2008/0007203 A1 | 1/2008 | Cohen et al. | |
| 2008/0042620 A1 | 2/2008 | Udono | |
| 2008/0238365 A1* | 10/2008 | Kaneko et al. | 320/109 |
| 2009/0024250 A1* | 1/2009 | Oaki et al. | 700/245 |
| 2009/0121673 A1 | 5/2009 | Nakayama et al. | |
| 2009/0149995 A1 | 6/2009 | Kaneko et al. | |
| 2011/0166704 A1* | 7/2011 | Hashimoto | 700/250 |

FOREIGN PATENT DOCUMENTS

| | | |
|---|---|---|
| JP | 2001273945 A | 10/2001 |
| JP | 2008131697 A | 6/2008 |

* cited by examiner

*Primary Examiner* — Arun Williams
(74) *Attorney, Agent, or Firm* — Dinsmore & Shohl LLP

(57) ABSTRACT

Systems and methods for charging a battery of a robot are provided. In one embodiment, a method includes providing a robot battery charging apparatus having a plurality of charging terminals, providing a robot having a plurality of battery terminals, and moving the robot into an engagement position with the robot battery charging apparatus such that the plurality of battery charging terminals contact the plurality of charging terminals. The method further includes detecting whether each battery terminal contacts the corresponding charging terminal in accordance with a first, second and third terminal contact condition. The method further includes providing power to the battery from the robot battery charging apparatus through one or more of the battery and charging terminals upon a verification that all of the battery terminals contacted the corresponding charging terminals in accordance with at least two of the first, second and third terminal contact conditions.

20 Claims, 5 Drawing Sheets

ROBOT BATTERY CHARGING APPARATUSES AND METHODS

TECHNICAL FIELD

The present invention generally relates to robot battery charging apparatuses and, more particularly, to robot battery charging apparatuses and methods for charging autonomous robots.

BACKGROUND

The use of autonomous robots to complete various tasks in industrial and/or manufacturing applications is becoming more prevalent. These robots may move freely and operate in a space shared with humans and equipment to complete tasks for which they are programmed. A battery charging station may be configured to mate with the robot when the robot positions itself on the battery charging station. With such an arrangement, there exists a risk of unwanted electrical discharge if an object other than the robot is positioned in between the robot and the battery charging station, or if an object comes into contact with exposed charging terminals of the battery charging station.

Accordingly, a need exists for alternative robot battery charging stations and methods to charge batteries of autonomous robots.

SUMMARY

In one embodiment, a method of charging a battery of a robot includes providing a robot battery charging apparatus having a plurality of charging terminals, providing a robot having a plurality of battery terminals configured to contact the plurality of charging terminals of the robot battery charging apparatus, and moving the robot into an engagement position with the robot battery charging apparatus such that the plurality of battery charging terminals contact the plurality of charging terminals. The method further includes detecting whether each battery terminal contacts the corresponding charging terminal in accordance with a first, second and third terminal contact condition. Power is provided to the battery from the robot battery charging apparatus through one or more of the battery and charging terminals upon a verification that all of the battery terminals contacted the corresponding charging terminals in accordance with at least two of the first, second and third terminal contact conditions.

In another embodiment, a robot battery charging system includes a robot having a battery and a plurality of battery charging terminals positioned on the robot and electrically coupled to the battery and a robot battery charging apparatus having a battery charging unit, a plurality of charging terminals, and a controller. The plurality of charging terminals is configured to contact a plurality of corresponding battery terminals positioned on a robot and electrically coupled to a robot battery. The controller is configured to determine whether each battery terminal contacts the corresponding charging terminal in accordance with a first, second and third terminal contact condition. The controller is further configured to control the battery charging unit such that a charging power is provided to the robot battery from the battery charging unit through one or more of the battery and charging terminals upon a verification that all of the battery terminals contacted the corresponding charging terminals in accordance with at least two of the first, second and third terminal contact conditions.

In yet another embodiment, a robot battery charging apparatus includes a battery charging unit, a plurality of charging terminals, and a plurality of electronic control units. Each of the electronic control units are associated with an individual one of the plurality of charging terminals. The plurality of charging terminals is configured to contact a plurality of corresponding battery terminals positioned on a robot and electrically coupled to a robot battery. Each of the plurality of electronic control units includes a force sensing circuit, a contact timing circuit and an impedance sensing circuit. The force sensing circuit is operable to measure a contact force value of an associated battery terminal pressed against a corresponding charging terminal. The contact timing circuit is operable to detect a physical contact between the associated robot battery terminal and the corresponding charging terminal, and determine a time value corresponding to the physical contact. The impedance sensing circuit is operable to measure a terminal impedance value at the associated charging terminal. Charging power is provided to the robot battery from the battery charging unit through one or more of the robot battery and charging terminals upon two or more of the following: the contact force values measured by each electronic control unit are within a valid contact force range; time lag values based on the determined time values for each electronic control unit are within a valid time lag value range; and the impedance values measured by each electronic control unit are within a valid terminal impedance range.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

As described herein, robot battery charging apparatuses may generally comprise a battery charging unit and a charging terminal assembly having a plurality of charging terminals configured to contact corresponding battery charging terminals located on a robot. After the robot positions itself on the robot battery charging apparatus in an engagement position, the robot battery charging apparatus can determine whether the battery terminals of the robot contact the corresponding charging terminals in accordance with a requisite number of terminal contact conditions. Power may be provided to the battery of the robot when the robot battery charging apparatus determines that the contact between the battery terminals of the robot and the charging terminals of the robot battery charging apparatus is in accordance with the requisite number of terminal contact conditions. Robot charging battery apparatuses and methods of charging a robot battery will be described in more detail herein.

Figure 1:
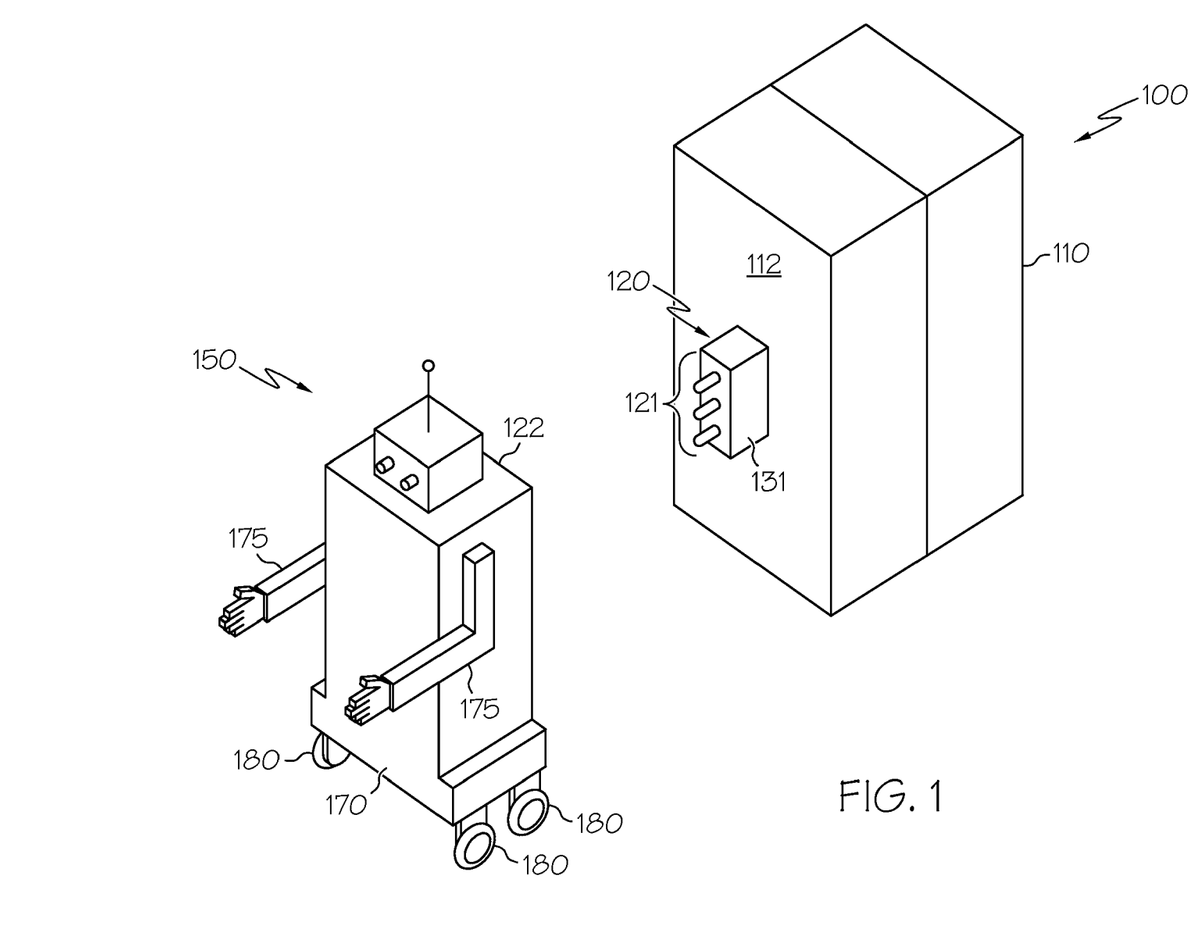
FIG. 1 depicts a schematic illustration of an exemplary robot battery charging apparatus and an exemplary robot according to one or more embodiments described and illustrated herein.
Figure 2:
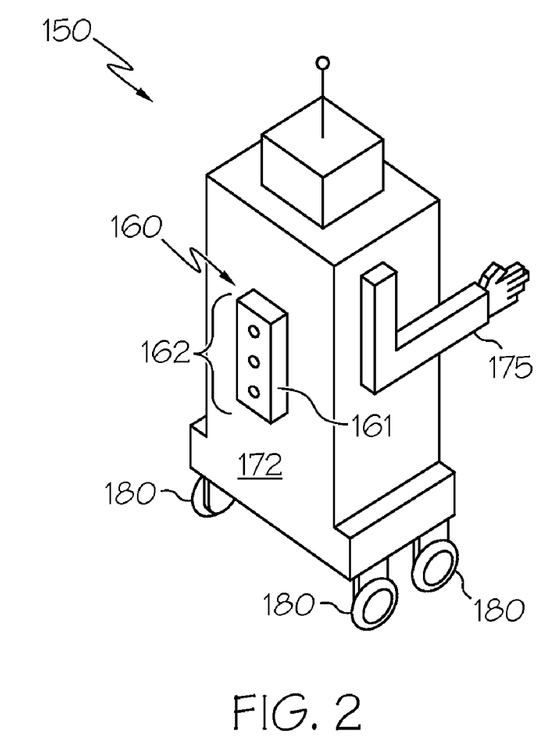
FIG. 2 depicts a schematic illustration of a rear view of any exemplary robot according to one or more embodiments described and illustrated herein.

Referring now to FIGS. 1 and 2, an exemplary robot battery charging apparatus 100 and an exemplary robot 150 are illustrated. It should be understood that embodiments described herein are not limited to the configuration of the robot and robot battery charging apparatus illustrated in FIGS. 1 and 2 as these components are provided for illustrative purposes only. The robot and robot battery charging apparatus may be configured in many different shapes, sizes and configurations. As such, embodiments described herein may be incorporated into any type of mobile robot and/or robot charging system.

The exemplary robot 150 illustrated in FIGS. 1 and 2 comprises a robot body 170 that is supported by several wheels 180, two appendages 175 used to complete programmed tasks, and a battery terminal assembly 160. The battery terminal assembly 160 may be located on a rear surface 172 of the robot body 170 as illustrated in FIG. 2. The battery terminal assembly 160 further comprises three battery terminals 162 arranged vertically within a battery terminal assembly base 161. As illustrated, these battery terminals 162 may be located on the battery terminal assembly 160 in a vertical manner. However, it should be understood that embodiments may utilize more or fewer battery terminals 162 depending on the particular robot application and requirements. Embodiments described herein may be implemented in robot systems having any number of battery and charging terminals as well as any terminal arrangements, configurations and locations (i.e., terminal arrangements other than a vertical arrangement or terminals positioned on a front surface of the robot, for example).

The robot battery charging apparatus 100 may comprise a housing 110 having a charging surface 112 from which a charging terminal assembly 120 may protrude. In another embodiment, the charging terminal assembly 120 may be recessed into the housing 110. A battery charging unit 125 and power supply 126 may also be maintained within the housing 110, as described in more detail below (see FIG. 7). The illustrated charging terminal assembly 120 comprises three vertically arranged charging terminals 121 extending from a charging terminal assembly base 131 configured to contact the corresponding battery terminals 162 located on the battery terminal assembly 160 of the robot 150.

Similarly, as described with respect to the battery terminals 162, embodiments may utilize any number of charging terminals 121 in any arrangement. The number, location and arrangement of the charging terminals 121 should correspond to the number, location and arrangement of the battery terminals 162 positioned on the robot 150 to ensure accurate contact between said terminals when the robot 150 positions itself on the robot battery charging apparatus 100. Although the charging terminals 121 are illustrated throughout the figures as cylindrical pegs, it should be understood that any type of connector pin and/or socket may be utilized.

The charging terminals 121 and the battery terminals 162 should be made of a conductive material to enable current flow between the robot battery charging apparatus 100 and robot 150 through the charging terminals 121 and battery terminals 162. The charging terminal assembly base 131 and the battery terminal assembly base 161 should be made of a non-conductive material to prevent electrical shorting between the charging terminals 121 and battery terminals 162 as well as between the robot battery charging apparatus 100 and the robot 150.

Figure 3:
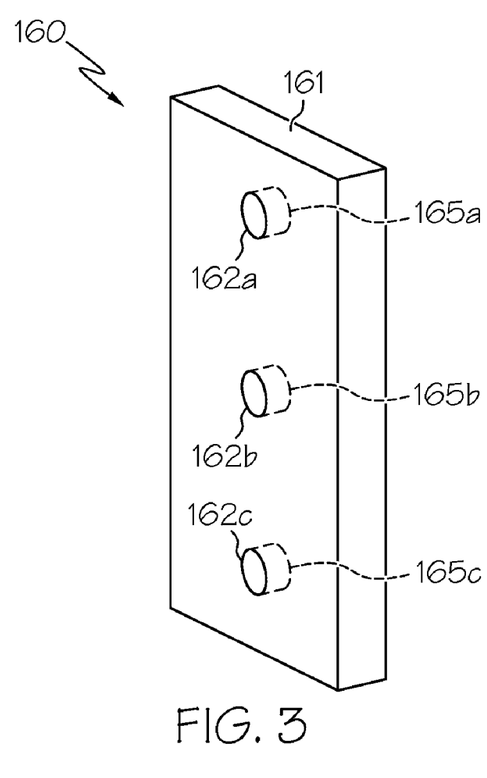
FIG. 3 depicts a schematic illustration of an exemplary battery terminal assembly according to one or more embodiments described and illustrated herein.
Figure 4:
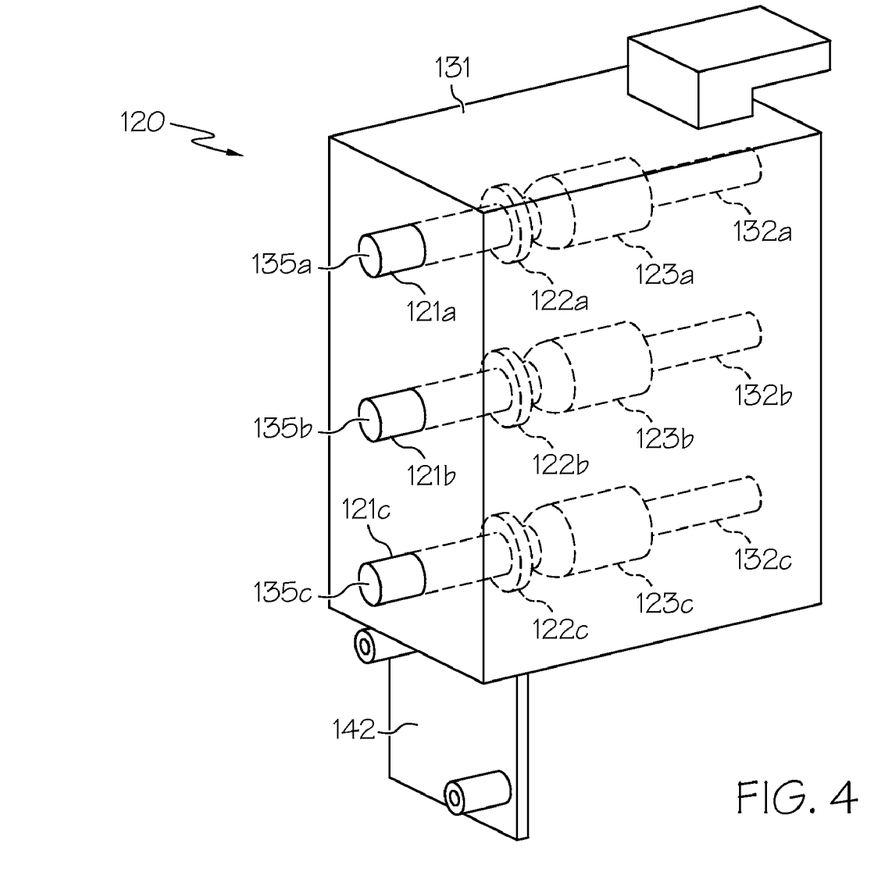
FIG. 4 depicts a schematic illustration of an exemplary charging terminal assembly according to one or more embodiments described and illustrated herein.
Figure 5:
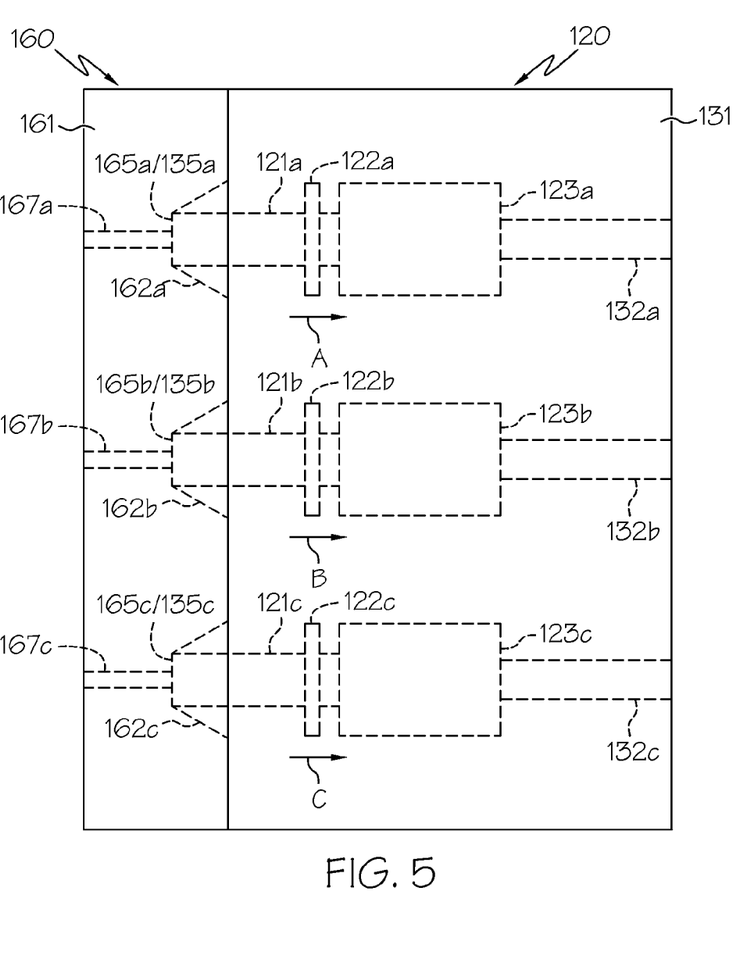
FIG. 5 depicts a schematic illustration of an exemplary battery terminal assembly and an exemplary charging terminal assembly in an engagement position according to one or more embodiments described and illustrated herein.

Referring to FIGS. 3-5, the battery terminal assembly 160 comprises three battery terminals 162a, 162b and 162c configured as chamfered recesses for accepting three corresponding charging terminals 121a, 121b and 121c. The chamfer of the battery terminals 162a, 162b, and 162c may aid in obtaining a successful engagement between the robot 150 and the robot battery charging apparatus 100 by providing a telescoping fit. Each of the battery terminals 162a, 162b, and 162c has a charging terminal engaging surface 165a, 165b and 165c, respectively, to engage a corresponding charging terminal 121a, 121b and 121c. The battery terminal assembly 160 may also comprise conductor elements 167a, 167b and 167c as illustrated in FIG. 5 to transfer a charging current or voltage to the battery of the robot 150.

Although the battery terminals 162 are illustrated as female terminals, it should be understood that the battery terminals may have other configurations, such as conductive pads in which the charging terminals 121 may contact during docking. Additionally, in some embodiments the charging terminals 121 may be configured as female connectors or terminals and the battery terminals 162 as male connectors or terminals. Embodiments described herein may be incorporated into any connection scheme.

FIG. 4 schematically illustrates an exemplary charging terminal assembly 120 having three charging terminals: battery charging terminal 121a, ground terminal 121b and power supply terminal 121c maintained within the charging terminal assembly base 131 (i.e., first, second and third charging terminals, respectively). The charging terminals 121a, 121b and 121c may be configured as male terminals such as those illustrated in FIG. 4. The charging terminals 121a, 121b and 121c may also have an battery terminal engaging surface 135a, 135b and 135c, respectively, that engage the corresponding charging terminal engaging surfaces 165a, 165b and 165c of battery terminals 162a, 162b and 162c, respectively as illustrated in FIG. 5. Conductor elements 132a, 132b and 132c may also be provided to enable the transfer of voltage or current through the charging terminals 121a, 121b and 121c.

As described above, more or fewer charging terminals may be provided for the same or different purposes than those described herein. For example, the robot battery charging apparatus may include one or more additional terminals to enable communication between the robot 150 and the robot battery charging apparatus 100. As described in more detail below, battery charging power (power voltage or current) may be provided to the robot 150 through the battery charging terminal 121a and the ground terminal 121b. Power supply voltage or current to power the robot 150 while the robot is docked on the robot battery charging apparatus 100 may be provided through the power supply terminal 121c and the ground terminal 121b. The charging terminal assembly 120 may be mounted onto or within the housing 110 by a bracket and corresponding mounting hardware 142.

FIG. 5 illustrates a battery terminal assembly 160 and a charging terminal assembly 120 in an engagement position. The charging terminal engaging surfaces 165a-165c of battery terminals 162a-162c press against the battery terminal engaging surfaces 135a-135c of charging terminals 121a-121c with an engagement force. It should be understood that the engagement configuration illustrated in FIG. 5 is for illustrative purposes only, as many different terminal configurations and arrangements are possible.

Figure 6:
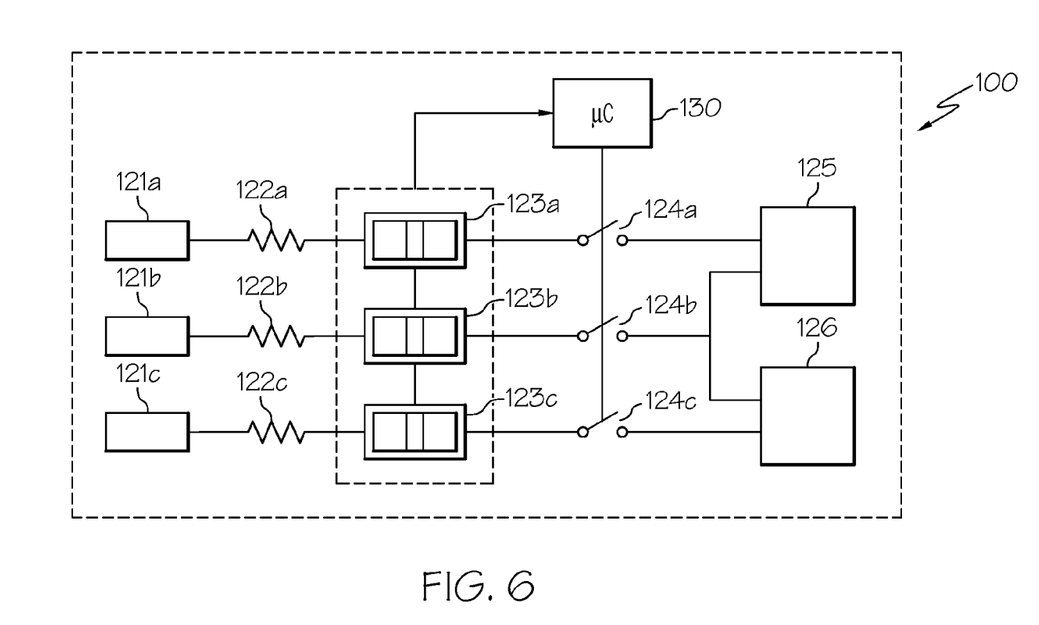
FIG. 6 depicts a schematic of an exemplary battery charging apparatus according to one or more embodiments described and illustrated herein.

Referring now to FIGS. 5 and 6, coupled to each charging terminal 121 are impact absorption springs 122a, 122b and 122c. The impact absorption springs 122a-122c may absorb the force created when the robot 150 positions itself on or proximate the robot battery charging apparatus 100. The force applied by the robot 150 to the robot battery charging apparatus 100 causes the impact absorption springs 122a-122c to deflect in a direction indicated by the arrows A, B and C of FIG. 5.

One end of each impact absorption spring 122a-122c may be connected to an electronic control unit 123a, 123b and 123c, respectively. As described in more detail below, the electronic control units 123a-c are operable to detect or measure contact parameters associated with the battery terminals contacting the charging terminals 121a-121c when the robot 150 docks with the robot battery charging apparatus 100. Each of electronic control units 123a-123c are communicably coupled to a controller 130. The electronic control units 123a-123c are configured to transmit terminal contact signals (e.g., first, second and third terminal contact signals) corresponding to the contact between the battery terminals and charging contacts to the controller 130. The controller 130 is programmed to determine whether the received terminal contact signals satisfy the terminal contact conditions, as described in more detail below.

The exemplary robot battery charging apparatus 100 depicted in FIG. 6 also comprises three battery charging switches 124a, 124b and 124c that are controlled by the controller 130. A battery charging switch 124a connects a battery charging unit 125 to the battery charging terminal 121a when activated by the controller 130. Similarly, a ground switch 124b connects robot battery charging apparatus ground to the ground terminal 121b, and a power supply switch 124c connects a power supply unit 126 to the power supply terminal 121c upon activation by the controller 130. The switches 124a-124c may be controlled by one or more relays that are controlled by the controller 130, and may be any type of switch capable of providing the requisite voltage and current (e.g., mechanical or solid state switches).

To ensure that power is provided to the charging terminals 121 only when a robot is docked on the robot battery charging apparatus 100 and not when another object is in contact with the charging terminals, the contact between each battery terminal 162 and each charging terminal 121 should satisfy a certain number of terminal contact conditions. When the robot 150 positions itself onto the robot battery charging apparatus 100 such that the battery terminals 162 contact the corresponding charging terminals 121, the electronic control units 123 are configured to detect three or more contact parameters. The contact parameters are associated with the contact between the battery terminals 162 and the charging terminals 121. The contact parameters are then communicated by each of the electronic control units 123 to the controller 130 of the robot battery charging apparatus 100. The controller 130 then compares the received contact parameters with several terminal contact conditions to determine if the contact between each battery terminal and each charging terminal meets the requisite number of terminal contact conditions.

In one embodiment, the electronic control units 123 are configured to detect a first, second and third contact parameter. Each charging terminal 121 has a first, second and third contact parameter associated therewith. For example, the ground electronic control unit 123b detects contact parameters associated with the contact imparted on the ground terminal 121b. The controller is programmed to compare the first, second and third contact parameters received from each electronic control unit with first, second and third terminal contact conditions, respectively. In one embodiment, power is provided to the robot only when the controller verifies that the contact parameters for each charging terminal are in accordance with at least two of the first, second and third terminal contact conditions. In another embodiment, power is provided to the robot only when the controller verifies that the contact parameters for each charging terminal are in accordance with all three of the terminal contact conditions. Embodiments may also utilize additional terminal contact conditions when enabling power flow from the robot battery charging apparatus 100 to the robot 150.

In one embodiment, the electronic control units 123 are configured to measure a contact force value, an impedance value and a time value for the respective charging terminals. The electronic control units 123 may be further configured to provide the controller with first, second and third contact signals corresponding to the measured contact force, impedance and time values. In this embodiment, the first, second and third terminal contact conditions comprise a valid contact force range, a valid terminal impedance range and a valid time lag value range. The controller 130 will therefore provide power from the battery charging unit 125 to the robot 150 when each charging terminal 121a-121b is contacted by the corresponding battery terminal 162 with a force that is within the valid contact force range, an impedance that is within the valid terminal impedance range, and at a timing such that the time lag between physical contact of each charging terminal is within a valid time lag value range.

Figure 7:
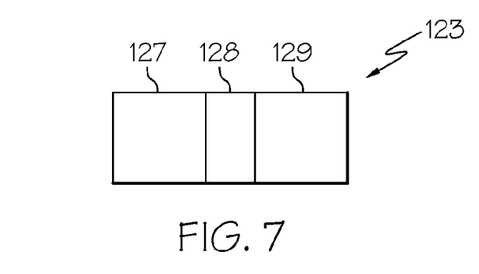
FIG. 7 depicts a schematic of an exemplary electronic control unit according to one or more embodiments described and illustrated herein.

Referring now to FIG. 7, an exemplary electronic control unit 123 is illustrated. The electronic control unit 123 comprises a force sensing circuit 127, a contact timing circuit 128 and an impedance sensing circuit 129. The parameters sensed by these circuits may be transmitted to the controller 130 for a determination whether they meet the first, second and third terminal contact conditions.

The force sensing circuit 127 detects a contact force value that corresponds to an amount of force provided when a battery terminal 162 strikes the corresponding charging terminal 121 as the robot 150 docks itself on the robot battery charging apparatus 100 (e.g., when the charging terminal engaging surfaces 165a-165c contact the battery terminal engaging surfaces 135a-135c. The force sensing circuit 127 may comprise an analog strain gauge, pressure sensor or other similar device capable of measuring force. The resulting contact force value may then be transmitted to the controller 130 for a determination whether it is within the valid contact force range. The valid contact force range may be variable and software or hardware controlled. The robot 150 may be programmed to dock with the robot battery charging apparatus 100 at a particular force such that the measured force value is within the valid contact force range. If the robot 150 or an object other than the robot does not contact the charging terminals 121 within the valid contact force range, the controller 130 may prevent power from being applied to the charging terminals 121.

The contact timing circuit 128 detects a physical contact of a battery terminal 162 with the corresponding charging terminal 121 and a time value associated with the physical contact. The electronic control unit 123 is configured to then transmit the time value to the controller 130. The controller 130 receives the time values from the electronic control units 123 and compares them to one another to determine a plurality of time lag values. In one embodiment, the contact timing circuit of each electronic control unit comprises a synched counter that provides a time value upon contact of the battery terminal with the corresponding charging terminal. In another embodiment, the electronic control unit may calculate the time lag values rather than the controller.

As an example and not a limitation, in an embodiment having three charging terminals, the electronic control unit 123a associated with the battery charging terminal 121a may provide a time value of 12,345 to the controller, the electronic control unit 123b associated with the ground terminal 121b may provide a time value of 12,333, and the electronic control unit 123c associated with the power supply terminal 121c may provide a time value of 12,400. The controller 130 may be programmed to compare these time values with one another to determine three time lag values. A first time lag value $\Delta_1$ is the difference between the time value of the battery charging terminal 121a and the time value of the ground terminal 121b ($\Delta_1=12,345-12,333=12$). A second time lag value $\Delta_2$ is the difference between the time value of the ground terminal 121b and the time value of the power supply terminal 121c ($\Delta_2=12,400-12,333=67$). A third time lag value $\Delta_3$ is the difference between the time value of the battery charging terminal 121a and the time value of the power supply terminal 121c ($\Delta_3=12,400-12,345=55$). The contact timing condition is satisfied if each of the time lag values are within the valid time lag value range, which may depend on the application and the frequency in which the counter is incremented. The valid time lag value range may be easily programmed or adjusted such that it may be varied on demand. If contact between the battery terminals and the corresponding charging terminals do not occur within the valid time lag value range, a discharge of charging power may be prevented.

The impedance sensing circuit 129 is configured to sense one or more terminal impedance values, which may include resistance values, capacitance values, inductance values, or combinations thereof. The impedance sensing circuit 129 may be any circuit capable of sensing the desired impedance value to be provided to the controller 130. For example, in a resistance value sensing embodiment, the impedance sensing circuit 129 may be a voltage divider circuit capable of determining the resistance presented at the charging terminal. Other circuits capable of detecting resistance, capacitance and/or inductance may be utilized. The controller 130 is programmed to determine whether the terminal impedance values received from the electronic control units 123 are within the valid impedance range (e.g., a resistance range, a capacitance range or an inductance range). If the terminal impedance values are within the valid impedance range, the condition is satisfied and, if the other conditions are also met, power may be provided to the charging terminals accordingly. Conversely, if the terminal impedance values are not within the valid impedance range, a discharge of power may be prevented.

In one embodiment, for power to be provided at the charging terminals, all of the charging terminals must be contacted in accordance with the first, second and third terminal contact conditions (e.g., the valid contact force range, the valid time lag value range, and the valid terminal impedance range). In another embodiment, each charging terminal must be contacted in accordance with at least two of the first, second and third terminal contact conditions for power to be provided. If the required terminal contact conditions are not met, the controller of the robot battery charging apparatus may provide an error status signal to the robot. Additionally, the error status signal may also be a visual status indicator such as lights positioned on the robot battery charging apparatus to indicate that a docking error has occurred. For example, the lights may indicate which charging terminal failed during the docking process. The robot battery charging apparatus may also comprise a display such as a liquid crystal display, for example, that may display one or more messages indicating to an operator which charging terminal caused the error and which terminal contact condition failed. The error status signal may also be in the form of an audible warning that puts personnel on notice that a docking error has occurred.

A charging operation in accordance with one embodiment of the present disclosure will now be described. As the robot is autonomously or pseudo-autonomously performing a variety of tasks, a sensor within the robot may provide a charging request signal to a robot controller. The robot controller may then place the robot in a battery charging station seeking mode (i.e., a robot battery charging apparatus seeking mode) in which the robot autonomously or pseudo-autonomously moves toward the charging station.

Once the robot finds the charging station, the robot initiates a docking procedure in which it aligns its battery terminals with the charging terminals of the charging station. The robot then moves itself such that the battery terminals contact the charging terminals. The robot and charging station may be in communication either wirelessly or by a wired connection via one or more terminals. The electronic control units associated with the charging terminals of the charging station may then measure a plurality of contact parameters such as force, timing and impedance as described above. The electronic control units transmit the contact parameters to the controller of the charging station, which compares the contact parameters to the terminal contact conditions.

If a failure is detected, the charging station may send a signal to the robot controller of the robot to retry the docking procedure to attempt a successful dock. An error status signal and visual/audible warnings may also be provided. If all (or some predefined requisite number) of the terminal contact conditions are met, the battery charging station controller may send a verification signal to the robot controller indicating that the docking procedure was successful. At this time, the charging station enters into a stand-by mode until it receives a charge initiation signal from the robot controller.

Once the robot controller receives the verification signal indicating that the docking procedure was successful, the robot controller may send signals to other modules within the robot (e.g., a laser guidance system) so that such modules may enter a charging mode. After these signals have been sent to the other modules, the robot controller may send an enable charging signal to the charging station controller. After receipt of the enable charging signal, the charging station may initiate charging by activating the switches as described above.

When the battery is completely charged, the charging station is configured to cease providing power to the robot. The robot may continue to operate while remaining docked on the charging station by drawing power from the power supply terminal as described above. In this manner, the robot may continue to perform tasks while docked on the charging station without drawing power from its battery or batteries. The robot may then undock itself in accordance with an undocking procedure and continue on to complete its programmed tasks.

It should now be understood that embodiments described herein verify that a robot is successfully coupled to a robot battery charging apparatus and provide power to the robot if a predetermined number of terminal contact conditions are met when battery terminals of the robot contact charging terminals of the robot battery charging apparatus. If a robot or an unauthorized object contacts the charging terminals not in accordance with the predetermined number of terminal contact conditions, power is not provided at the charging terminals and an error status signal may be issued.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method of charging a battery of a robot comprising:
    providing a robot battery charging apparatus comprising a plurality of charging terminals;
    providing a robot comprising a plurality of battery terminals configured to contact the plurality of charging terminals of the robot battery charging apparatus;
    moving the robot into an engagement position with the robot battery charging apparatus such that the plurality of battery charging terminals contact the plurality of charging terminals;
    detecting whether each battery terminal contacts a corresponding charging terminal in accordance with a first terminal contact condition;
    detecting whether each battery terminal contacts the corresponding charging terminal in accordance with a second terminal contact condition;
    detecting whether each battery terminal contacts the corresponding charging terminal in accordance with a third terminal contact condition; and
    providing charging power to the battery from the robot battery charging apparatus through one or more of the battery and charging terminals upon a verification that all of the battery terminals contacted the corresponding charging terminals in accordance with at least two of the first, second and third terminal contact conditions.

2. The method as claimed in claim 1, wherein the charging power is provided to the battery upon a verification that all of the battery terminals contacted the corresponding charging terminals in accordance with all of the first, second and third terminal contact conditions.

3. The method as claimed in claim 1, further comprising providing an error status signal upon a verification that one or more of the battery terminals failed to contact one or more corresponding charging terminals in accordance with at least two of the first, second, and third terminal contact conditions.

4. The method as claimed in claim 3, wherein the error status signal comprises a visual status indicator, an audible warning, or a combination thereof.

5. The method as claimed in claim 1, wherein detecting whether each battery terminal contacts the corresponding charging terminal in accordance with the first, second or third terminal contact conditions further comprises:
    measuring a terminal impedance value at each of the charging terminals; and
    determining whether the measured terminal impedance value for each charging terminal is within a valid terminal impedance range.

6. The method as claimed in claim 5, wherein:
    the terminal impedance value is a resistance value, a capacitance value, an inductance value, or combinations thereof; and
    the valid terminal impedance range is resistance range, a capacitance range, an inductance range, or combinations thereof.

7. The method as claimed in claim 1, wherein detecting whether each battery terminal contacts the corresponding charging terminal in accordance with the first, second or third terminal contact conditions further comprises:
    measuring a contact force value provided upon a contact of each of the battery terminals with the corresponding charging terminals; and
    determining whether each measured contact force value is within a valid contact force range.

8. The method as claimed in claim 1, wherein detecting whether each battery terminal contacts the corresponding charging terminal in accordance with the first, second or third terminal contact conditions further comprises:
    detecting a physical contact between each of the battery terminals and the corresponding charging terminals;
    determining time lag values corresponding to the physical contacts between each of the battery terminals and the corresponding charging terminals; and
    determining whether the time lag values for each charging terminal are within a valid time lag value range.

9. The method as claimed in claim 8, wherein:
    the plurality of battery terminals comprises a first battery terminal, a second battery terminal and a third battery terminal;
    the plurality of charging terminals comprises a first charging terminal, a second charging terminal and a third charging terminal; and
    the time lag values comprise:
        a first time lag value $\Delta_1$ between the physical contact of the first battery terminal with the first charging terminal and the physical contact of the second battery terminal with the second charging terminal;
        a second time lag value $\Delta_2$ between the physical contact of the second battery terminal with the second charging terminal and the physical contact of the third battery terminal with the third charging terminal; and
        a third time lag value $\Delta_3$ between the physical contact of the first battery terminal with the first charging terminal and the physical contact of the third battery terminal with the third charging terminal.

10. A robot battery charging system comprising:
    a robot comprising a battery and a plurality of battery charging terminals positioned on the robot and electrically coupled to the battery; and
    a robot battery charging apparatus comprising a battery charging unit, a plurality of charging terminals, and a controller;
    wherein:
        the plurality of charging terminals is configured to contact the plurality of corresponding battery terminals when the robot and the robot battery charging apparatus are in an engagement position; and
        the controller is configured to:
            determine whether each battery terminal contacts a corresponding charging terminal in accordance with a first terminal contact condition;

determine whether each battery terminal contacts the corresponding charging terminal in accordance with a second terminal contact condition;

determine whether each battery terminal contacts the corresponding charging terminal in accordance with a third terminal contact condition; and control the battery charging unit such that a charging power is provided to the robot battery from the battery charging unit through one or more of the battery and charging terminals upon a verification that all of the battery terminals contacted the corresponding charging terminals in accordance with at least two of the first, second and third terminal contact conditions.

11. The robot battery charging system as claimed in claim 10, wherein the charging power is provided to the robot battery upon a verification that all of the battery terminals contacted the corresponding charging terminals in accordance with all of the first, second and third terminal contact conditions.

12. The robot battery charging system as claimed in claim 10, wherein the robot battery charging apparatus further comprises a plurality of electronic control units associated with the plurality of charging terminals, each electronic control unit configured to:

provide the controller with a first terminal contact signal corresponding with a contact between each battery terminal contact and the corresponding charging terminal;

provide the controller with a second terminal contact signal corresponding with a contact between each battery terminal contact and the corresponding charging terminal; and provide the controller with a third terminal contact signal corresponding with a contact between each battery terminal contact and the corresponding charging terminal.

13. The robot battery charging system as claimed in claim 12, wherein the first terminal contact signal represents an impedance value present at an associated charging terminal, the second terminal contact signal represents a contact force value present at the associated charging terminal, and the third terminal contact signal represents a time value at the associated charging terminal.

14. The robot battery charging system as claimed in claim 12, wherein the first terminal contact condition comprises a valid terminal impedance range, the second terminal contact condition comprises a valid contact force range, and the third terminal contact condition comprises a valid time lag value range.

15. A robot battery charging apparatus comprising a battery charging unit, a plurality of charging terminals, and a plurality of electronic control units, wherein:

each of the electronic control units are associated with an individual one of the plurality of charging terminals;

the plurality of charging terminals is configured to contact a corresponding plurality of battery terminals positioned on a robot and electrically coupled to a robot battery;

each of the plurality of electronic control units further comprise:

a force sensing circuit operable to measure a contact force value of an associated battery terminal pressed against a corresponding charging terminal;

a contact timing circuit operable to detect a physical contact between the associated battery terminal and the corresponding charging terminal, and determine a time value corresponding to the physical contact; and an impedance sensing circuit operable to measure a terminal impedance value at the corresponding charging terminal; and charging power is provided to the robot battery from the battery charging unit through one or more of the robot battery and charging terminals upon two or more of the following:

the contact force values measured by each electronic control unit are within a valid contact force range;

time lag values based on the determined time values for each electronic control unit are within a valid time lag value range; and the terminal impedance values measured by each electronic control unit are within a valid terminal impedance range.

16. The robot battery charging apparatus as claimed in claim 15, wherein the robot battery charging apparatus further comprises a power supply operable to provide current or voltage to the robot such that the robot may operate while coupled to the robot battery charging apparatus without drawing power from the robot battery upon two or more of the following:

the contact force values measured by each electronic control unit are within the valid contact force range;

time lag values based on the determined time values for each electronic control unit are within the valid time lag value range; and the terminal impedance values measured by each electronic control unit are within the valid terminal impedance range.

17. The robot battery charging apparatus as claimed in claim 15, wherein the force sensing circuit comprises a pressure sensor or a strain gauge.

18. The robot battery charging apparatus as claimed in claim 15, wherein:

the terminal impedance value is a resistance value, a capacitance value, an inductance value, or combinations thereof; and the valid terminal impedance range is resistance range, a capacitance range, an inductance range, or combinations thereof.

19. The robot battery charging apparatus as claimed in claim 15, wherein:

the robot battery charging apparatus further comprises a controller communicably coupled to each electronic control unit;

each electronic control unit is operable to transmit the contact force values, the time values and the terminal impedance values to the controller;

the controller is operable to:

determine whether each measured contact force value is within the valid contact force range;

calculate the time lag values based on the determined time values and determine whether each time lag value is within the valid time lag value range; and determine whether each measured terminal impedance value is within the valid terminal impedance range.

20. The robot battery charging apparatus as claimed in claim 15, wherein:

the plurality of battery terminals comprises a first battery terminal, a second battery terminal and a third battery terminal;

the plurality of charging terminals comprises a first charging terminal, a second charging terminal and a third charging terminal; and the time lag values comprise:
- a first time lag value $\Delta_1$ between the physical contact of the first battery terminal with the first charging terminal and the physical contact of the second battery terminal with the second charging terminal;
- a second time lag value $\Delta_2$ between the physical contact of the second battery terminal with the second charging terminal and the physical contact of the third battery terminal with the third charging terminal; and
- a third time lag value $\Delta_3$ between the physical contact of the first battery terminal with the first charging terminal and the physical contact of the third battery terminal with the third charging terminal.

* * * * *